United States Patent
Schroth

(10) Patent No.: US 7,899,958 B2
(45) Date of Patent: Mar. 1, 2011

(54) INPUT/OUTPUT COMPLETION SYSTEM AND METHOD FOR A DATA PROCESSING PLATFORM

(75) Inventor: David W. Schroth, Minneapolis, MN (US)

(73) Assignee: Unisys Corporation, BlueBell, PA (US)

( * ) Notice: Subject to any disclaimer, the term of this patent is extended or adjusted under 35 U.S.C. 154(b) by 1038 days.

(21) Appl. No.: 11/643,313

(22) Filed: Dec. 21, 2006

(65) Prior Publication Data
US 2010/0064073 A1 Mar. 11, 2010

(51) Int. Cl.
*G06F 3/00* (2006.01)
(52) U.S. Cl. .......................................... 710/52; 710/56
(58) Field of Classification Search ................... 710/52, 710/56
See application file for complete search history.

(56) References Cited

U.S. PATENT DOCUMENTS

| | | | |
|---|---|---|---|
| 7,318,140 B2 * | 1/2008 | Flemming et al. | 711/173 |
| 2003/0217184 A1 * | 11/2003 | Nair | 709/250 |
| 2006/0075204 A1 * | 4/2006 | Kumar | 711/173 |

* cited by examiner

*Primary Examiner* — Alford W Kindred
*Assistant Examiner* — David E Martinez
(74) *Attorney, Agent, or Firm* — Robert P. Marley

(57) ABSTRACT

A mechanism is disclosed for performing I/O operations using queue banks within a data processing system that supports multiple processing partitions. A queue bank is a re-useable area of memory allocated for performing I/O operations. All memory locking and address-translation functions are generally performed only once for a queue bank to reduce system overhead. After a queue bank has been used to perform an I/O operation, some processing is performed to make it available for re-use. This processing determines whether the queue bank contains memory that is being removed from a current processing partition. If so, a delay is imposed so that the queue bank is not made available for immediate re-use. This creates a window of time wherein all queue banks that contain the affected memory are inactive, thereby allowing the affected memory to be removed from the partition without halting on-going I/O activity.

7 Claims, 5 Drawing Sheets

INPUT/OUTPUT COMPLETION SYSTEM AND METHOD FOR A DATA PROCESSING PLATFORM

FIELD OF THE INVENTION

The current invention relates to performing I/O operations in a data processing system; and more particularly, relates to a system and method that allow queue banks to be used to perform I/O operations in an optimal manner in a data processing system that supports the use of processing partitions.

BACKGROUND OF THE INVENTION

In data processing systems, Input/Output (I/O) operations are generally used to store data to, or retrieve data from, mass storage devices. Such devices may include tapes, disks, flash memory devices, and other retentive data storage media. Such I/O operations may also be used to transfer data across networks, such as Local Area Networks (LANs), Wide Area Networks (WANs), and other communication infrastructures.

A typical I/O request may be initiated as follows. An application program makes a request to an operating system (OS) of a data processor to initiate an I/O operation. The request may indicate the type of I/O operation that is to be performed (e.g., read versus write), an address of a buffer in memory from which, or to which, data is to be transferred, and the amount of data that is to be transferred. The buffer address may be described as a virtual address within virtual, rather than physical, address space.

In response to such a request, the OS may perform an address translation function that will translate any provided virtual address into one or more physical addresses. The physical addresses are the addresses that will be used by an I/O device to access the physical area in memory to which data will be stored, or from which data will be retrieved, during the I/O operation. The OS will also take actions to lock the buffer in memory. This ensures that while the I/O operation is occurring, the buffer will not be re-located within virtual address space, and that the buffer will not be paged out of memory.

After the OS has performed the address translation and locked the buffer in memory, the OS will issue a request to the appropriate I/O device, such as an I/O processor. The I/O device will transfer data to, or retrieve data from, the memory buffer. When the I/O operation is complete, the I/O device will generally initiate an interrupt to the OS. The memory buffer that was used to perform the I/O operation is then unlocked, and may be re-allocated for a different use.

The overhead associated with the OS performing address translation and locking of the buffer is not insignificant. If many I/O operations are occurring within memory at once, this overhead can impact system performance. To address this limitation, some prior art systems dedicate memory areas specifically for use in performing I/O operations. The address translation and locking operations associated with these dedicated memory areas are performed at the time these areas are created, or alternatively when the memory areas are first used. This eliminates the need to perform these tasks at the time an I/O request is issued, thereby minimizing the time required to complete the request. However, this use of dedicated I/O memory areas can create problems in data processing systems that are "partitionable".

A partitionable data processing system is one that supports the creation of multiple processing partitions. A processing partition is a processing environment that includes at least a subset of all of the resources of that data processing system. For instance, in a system wherein multiple instruction processors (IPs) are coupled to a main memory, a partitionable system may be configured into two processing partitions. Each partition will generally include at least one IP and a portion of main memory. The resources of a given partition are communicatively coupled to one another, but logically isolated from the resources of other processing partitions via software and/or hardware enables. This allows the resources of a partition to operate substantially independently from the rest of the system under the control of a dedicated operating system instance. In this manner, a first processing partition may be executing one or more software applications independently of any execution that is occurring within one or more other partitions of the same data processing system.

It is often desirable to modify the way a data processing system is partitioned. This may involve moving a processor, an I/O device, and/or a memory area that was previously included within one partition to a different partition, for example. In prior art systems, complications arise if a memory area dedicated to performing I/O operations is to be moved between first and second partitions in this manner. To enable this re-partitioning activity to complete successfully, it is generally necessary to halt I/O activity occurring within the first partition, re-partition the memory, and then re-start the I/O activity. As may be appreciated, this disrupts normal system operations and results in delay.

What is needed, therefore, is a system and method that allows I/O operations to be performed in an optimized manner that addresses at least some of the above-described limitations.

SUMMARY OF THE INVENTION

According to the invention, a mechanism is provided to more efficiently perform I/O operations in a data processing system that supports multiple data processing partitions. Areas in memory called queue banks are allocated for use in performing an I/O operation. During an I/O read operation, data is transferred from an I/O device to a queue bank in memory. Conversely, when an I/O write operation is being performed, data is transferred from a queue bank in memory to an I/O device. The use of queue banks in this manner increases the efficiency of the system because the memory allocated for a queue bank is locked once when the queue bank is first used. Moreover, the address translation functions needed to translate any virtual addresses to physical addresses is also performed once for the queue bank when it is first used. Therefore, the locking and address translation functions need not be performed at the time an I/O request is received such that this overhead is not imposed on the I/O operation.

According to the invention, after a queue bank is created and is ready for use, the queue bank is added to a corresponding available queue. An available queue is a linked list of queue banks that are available to be used to perform I/O operations. When a communication driver (e.g., a driver for an I/O device or network interface device) receives a request to perform an I/O operation, that driver obtains a queue bank from an available queue. The driver creates a description of the requested I/O operation within a header of the obtained queue bank. The driver then calls a communication function of the operating system, which adds the queue bank onto a system queue, which in one embodiment is either an input or output queue, depending on the type of I/O operation to be performed. Thereafter, the appropriate I/O device can access the queue bank and perform the described operation.

When the I/O device has completed the operation, any data received with the I/O operation (e.g., data received during a read operation) is made available to the driver. The driver, in turn, passes the data to the entity that requested the I/O operation, which may be an application program. Then the driver places the queue bank on a system return queue so that the queue bank becomes eligible for re-use in performing a future I/O operation.

Periodically, return queue logic of the operating system moves each queue bank that is queued to the system return queue back to an appropriate available queue. This task must be performed by the operating system for at least the reason that the drivers do not have the required privilege level to add queue banks to an available queue. This restriction protects the integrity of the available queues and ensures that only appropriate queue banks are being used to perform I/O operations.

When the return queue logic of an operating system moves a queue bank from the system return queue back to an available queue, the return queue logic determines whether this queue bank is associated with any partitioning activity. More specifically, the return queue logic determines whether any memory that has been allocated to the queue bank is being removed from the current processing partition. Any queue banks that include any portion of a memory area being removed from a partition must be inactive before that re-partitioning operation can occur. Any I/O operation directed to any such queue bank must be completed before the memory is removed from the first partition. If this requirement is not enforced, loss of data may result.

According to the current invention, if the return queue logic is moving a queue bank from the system return queue to an available queue, and if the return queue logic determines the queue bank contains memory that is being removed from the partition, the queue bank is placed at the end of the linked list that comprises the available queue. Because the drivers always obtain queue banks from the front of an available queue, placing a queue bank at the end of the queue makes it highly unlikely that the queue bank will be selected again for re-use before the partitioning activity can be completed.

In contrast to the foregoing, if the queue bank does not contain memory that is being removed from the processing partition, the queue bank is placed at the front of the linked list so that it is available to perform another I/O operation substantially immediately. This is advantageous because if a queue bank is re-used relatively soon after a prior use, addresses of the queue bank likely remain cached in system caches, such as the caches of instruction processors. This increases the efficiency with which processing activities can be completed by the driver when setting up a description of a next I/O operation within that queue bank.

A monitoring process is also provided by the invention. When memory is being removed from the partition, the monitoring process determines which queue banks, if any, contain any of this memory. The monitoring process then determines when none of these queue banks are being used for I/O operations. At such a time, the monitoring process can signal that the memory may safely be removed from the partition. As may be appreciated, this monitoring process is aided by returning all affected queue banks to the end, rather than the beginning, of the available queues in the manner described above. This is because all queue banks affected by the partitioning activity will accumulate at the end of available queues without entering into re-use so that a window of opportunity is opened to remove the memory from the partition without affecting on-going I/O activity.

Each queue bank is associated with a "use count" that indicates whether that queue bank is potentially being used at a given time to perform an I/O operation. The monitoring process determines that a queue bank is no longer being used to perform any I/O operations when that queue bank's use count is set to zero. Thus, the monitoring process cannot signal that an area of memory may be removed from a partition until all queue banks that include any portion of that memory have a use count of zero.

A queue bank's use count is incremented by the operating system each time that queue bank is queued to the system queue for use in performing an I/O operation. A queue bank's use count may not be decremented for that I/O operation until some time well after that I/O operation completes. In fact, the queue bank may be re-selected for use in a next I/O operation before its use count is decremented for a previous I/O operation. This is because the processing activity which decrements a queue bank's use count is typically only performed during "clean-up" activities associated with the system queues.

According to another aspect of the invention, a process is added to the system return logic to scan each of the system queues for any such clean-up activities that need to be completed so that use counts for currently unused queue banks may be decremented as soon as possible. This lengthens the window of opportunity during which all queue banks affected by re-partitioning activity have use counts of zero, making it even more likely that the monitoring process will locate a time wherein memory may be removed from a partition without the need to affect any on-going I/O activity.

According to one embodiment of the invention, a computer-implemented method for managing I/O operations is disclosed. This method is adapted for use within a data processing system that supports multiple processing partitions. This method includes determining whether a queue bank that has been dedicated for use in performing I/O operations is currently waiting to be re-used. The method also includes making the queue bank available for re-use in performing the I/O operations in a manner that is based upon whether modifications that affect the queue bank are being made to a processing partition containing the queue bank.

Another aspect of the invention relates to a data processing system that includes an operating system to allocate memory to one or more queue banks, each of which is dedicated for use in performing I/O operations. The system includes partitioning logic coupled to the operating system to manage a processing partition in which the queue banks are being used, and return queue logic coupled to the partitioning logic to determine, after a queue bank is used to perform an I/O operation, whether any portion of memory allocated to the queue bank is memory to be removed from the processing partition. If not, the return queue logic makes the queue bank available for immediate re-use in performing another I/O operation. Otherwise, re-use of the queue bank is delayed.

Another embodiment relates to a data processing system that includes operating system means for allocating memory to at least one queue bank means within a processing partition. Each of the at least one queue bank means is for use in performing I/O operations. The system further includes available queue means for making each of the at least one queue bank means available for use in performing the I/O operations. Also disclosed are return means for returning any of the at least one queue banks means to the available queue means after the queue bank means has been used to complete an I/O operation, whereby the queue bank means is returned to a first end of the available queue means if the queue bank means does not include memory being removed from the processing partition. Otherwise, the queue bank means is returned to a second end of the available queue means.

Yet another aspect of the invention involves media for storing instructions that cause a data processing system to perform a method. The method includes allocating memory to multiple queue banks within a first one of multiple processing partitions supported by the data processing system. The multiple queue banks are used to perform I/O operations. The method also comprises selecting memory to be removed from the first of the processing partitions.

As each of the queue banks potentially becomes available for re-use, the method determines whether the queue bank contains any of the selected memory, and if so, re-use of the queue bank is delayed. Otherwise, the queue bank is made available for immediate re-use.

Other scopes and aspects of the invention will become apparent from the following description and the accompanying drawings.

DETAILED DESCRIPTION OF THE DRAWINGS

Figure 1:
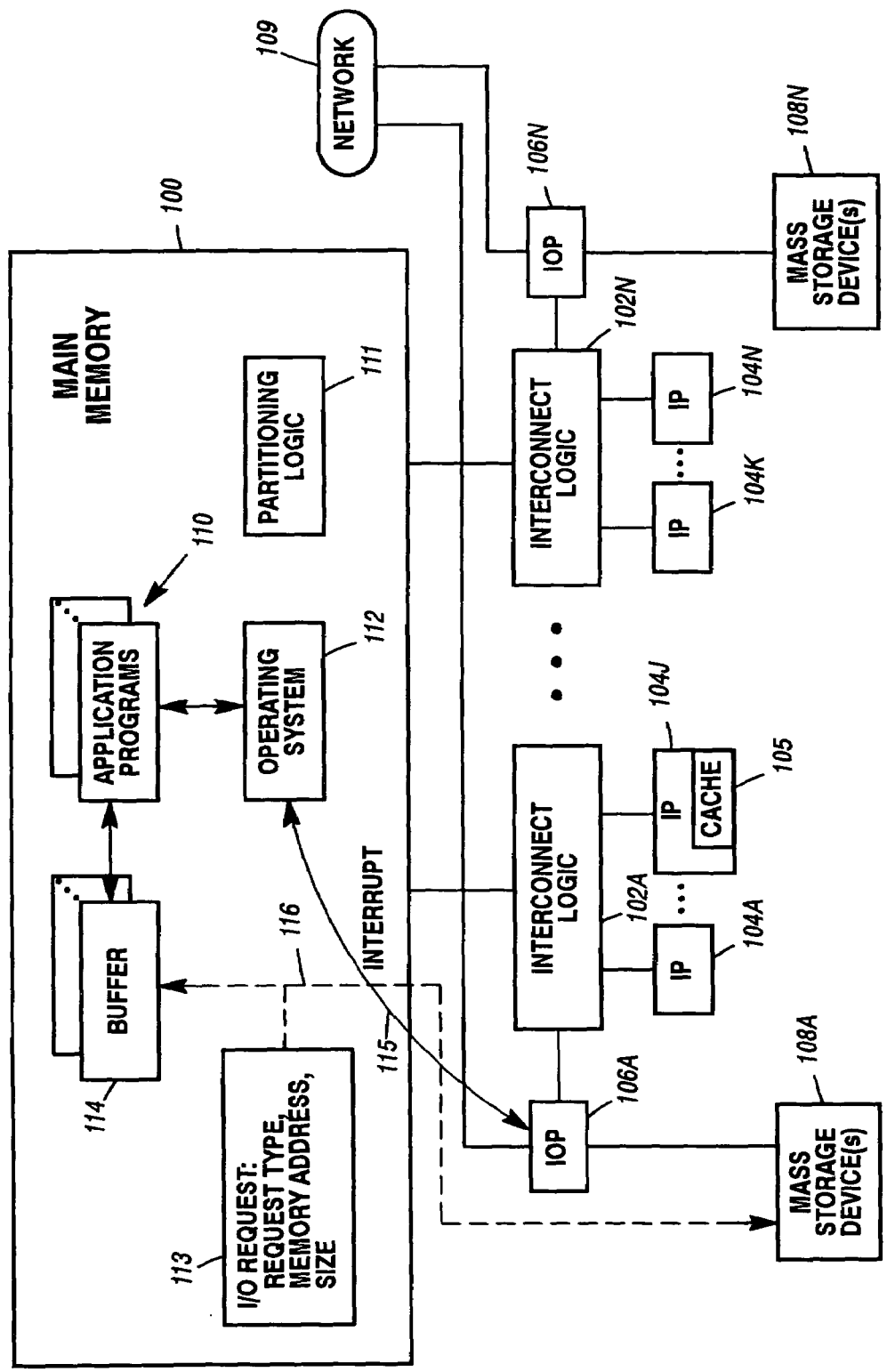
FIG. 1 is a block diagram of an exemplary data processing system that may advantageously utilize the current invention.

FIG. 1 is a block diagram of an exemplary data processing system that may advantageously utilize the current invention. The system of FIG. 1 includes a main memory 100 that is coupled to one or more interconnect circuits 102A-102N, which may be bridge circuits, for example. Such interconnect circuits may optionally include a shared cache. Each interconnect circuit may be further coupled to one or more instruction processors (IPs) 104A-104N, and one or more input/output processors (IOPs) 106A-106N. One or more of IPs 104 may include one or more caches, as is represented by cache 105 of IP 104J.

Each of the IOPs 106A-106N transfers data between main memory 100 and mass storage devices 108A-108N, respectively. The mass storage devices may include disks, tapes, flash storage devices, and any other retentive storage devices known in the art. The IOPs may alternatively or additionally be of a type that transfers data to a communication network, represented by network 109. This network may be a local area network (LAN), a wide area network (WAN), the Internet, an intranet, a wireless network, or any other type of similar communication infrastructure known in the art.

The data processing system of FIG. 1 may be of a type that allows multiple partitions to be created. A partition is a subset of all of the hardware in the system that has been selectively enabled to operate as a sub-system substantially independently from the rest of the machine. For instance, a partition may include a portion of the system memory, one or more instruction processors, and one or more IOPs, and may operate under the control of a respective instance of an operating system.

A partition is generally created using hardware and software switches and interface enables that allow the units in the partition to communicate with one another while being isolated from the rest of the system. User interface logic is also provided to allow a user such as an operator to select how the partitions should be configured. Taken together, the logic required to create, manage, modify, and remove partitions is represented by partitioning logic 111 of FIG. 1. The significance of partitioning functions as they relate to the current invention is discussed further below.

In a system such as FIG. 1, an I/O operation may be initiated as follows. One of application programs 110 or some other software entity may make a request to the operating system (OS) 112 requesting the initiation of an I/O operation. This type of request generally includes an indication as to the type of I/O operation being requested (e.g., read versus write), an address to a buffer 114 in main memory to, or from, which data is to be transferred, and the size of the transfer to be involved in the I/O operation. The information included in the request is represented by block 113.

As is known in the art, most data processing systems support a virtual address space that is larger than the size of the physical memory, which is represented by main memory 100 in FIG. 1. At any given time, only a subset of all virtual addresses is resident in main memory 100, with the remaining portions of virtual address space being "paged out" to mass storage devices 108A-108N.

Application programs 110 generally have visibility only to virtual, not physical, address space. Therefore, an I/O request made by an application program will identify a buffer 114 using the virtual address of the buffer. However, the IOPs perform transfer operations using physical memory addresses. Therefore, OS 112 must convert a provided virtual address to its physical-address counterpart. This is done using various page tables and other constructs in a manner largely beyond the scope of the current invention.

In addition to converting a virtual address into its real-address counterpart, OS 112 must also lock a buffer 114 before the I/O operation may be initiated. Locking the buffer involves setting various indicators associated with this buffer to ensure that while the buffer is locked, it is not paged out of main memory 100 and the virtual-to-physical address mapping for the buffer is not changed.

After address conversion and locking are completed, OS 112 may initiate the I/O operation. This may be accomplished by issuing an interrupt to the IOP that is to perform the operation. For instance, OS 112 may issue an interrupt to IOP 106A, as indicated by arrow 115. Alternatively, in a system that utilizes polling, the OS 112 may set some type of indicator at a predetermined location in main memory 100 that is accessible to IOP 106A. The setting of this indicator is detected by the IOP, which then may begin processing the associated I/O request.

After the IOP receives an interrupt or determines via polling that an I/O operation is to be initiated, the IOP will access a predetermined location in main memory 100 to determine what type of I/O operation to perform, the physical address of the buffer 114 that is to be involved in the transfer operation, and the size of this operation. IOP 106A will complete the data transfer operation and return a completion interrupt to OS 112, as represented by arrow 115. The OS will access another predetermined location in main memory 100 to obtain completion status for the I/O operation.

According to the mechanism described above, some overhead is imposed on the system after an I/O request is received by OS 112. This overhead involves performing the virtual-to-real address translation and completing a locking operation for the memory area that is specified by the I/O request. This overhead is not inconsequential, particularly if the buffer involved in the I/O operation is very large. In this case, the virtual address range occupied by the buffer may map to many pages of physical memory. The mapping and locking operations must occur for each physical page. These operations may impact system throughput, particularly at times when a large number of I/O requests are being issued.

As is known in the prior art, one way to alleviate the overhead associated with address conversion and locking activities involves using dedicated memory areas to perform I/O operations. These memory areas are allocated for the specific purpose of transferring data to, or receiving data from, an IOP during an I/O operation. Because all locking and address translation activities are completed for these dedicated memory areas at the time these areas are allocated, these functions need not be performed at the time an I/O request is received. This reduces system overhead.

Here-to-fore, using dedicated memory areas to perform I/O operations in the above-described manner has created challenges, particularly in data processing systems that support the creation of multiple processing partitions.

As an example of the foregoing, assume that the data processing system of FIG. 1 supports multiple processing partitions in the manner described above. A first processing partition may be created to include a portion of main memory 100, IPs 104A-104J, IOP 106A, and mass storage device(s) 108A. A second partition may include a remaining portion of main memory 100, IPs 104K-104N, IOP 106N, and mass storage devices 108N. Each of the first and second partitions is controlled by a respective instance of an operating system that is loaded into corresponding areas of main memory 100. Various application programs may be executing within the first partition independently of other application programs that are executing within the second partition.

After multiple partitions have been created in the above-described manner, it is often desirable to modify the way a data processing system is partitioned. This may involve moving a memory area that was previously included within the second partition to the first partition or vice versa, for example. In prior art systems, complications arise if a memory area that is dedicated to performing I/O operations is being moved from a first to a second partition. To accomplish this type of operation, all I/O operations that were occurring within the first partition must be allowed to complete, and initiation of any additional I/O operations is suspended. This ensures that no I/O operations are occurring to the memory area that is being moved between partitions. The memory involved in the re-partitioning activity is then moved to the other partition. Thereafter, the I/O operations in the first partition may be resumed.

The type of procedure described above is necessary so that an I/O operation is not occurring to an area of memory during the re-partitioning of that memory area, resulting in possible loss of data and/or data security concerns. As may be appreciated, requiring I/O operations to be suspended during memory re-partitioning disrupts normal processing activities and results in delay. These challenges associated with using dedicated memory areas to perform I/O operations in a partitionable system are addressed using the current invention, as will be described in regards to the remaining Figures.

Figure 2:
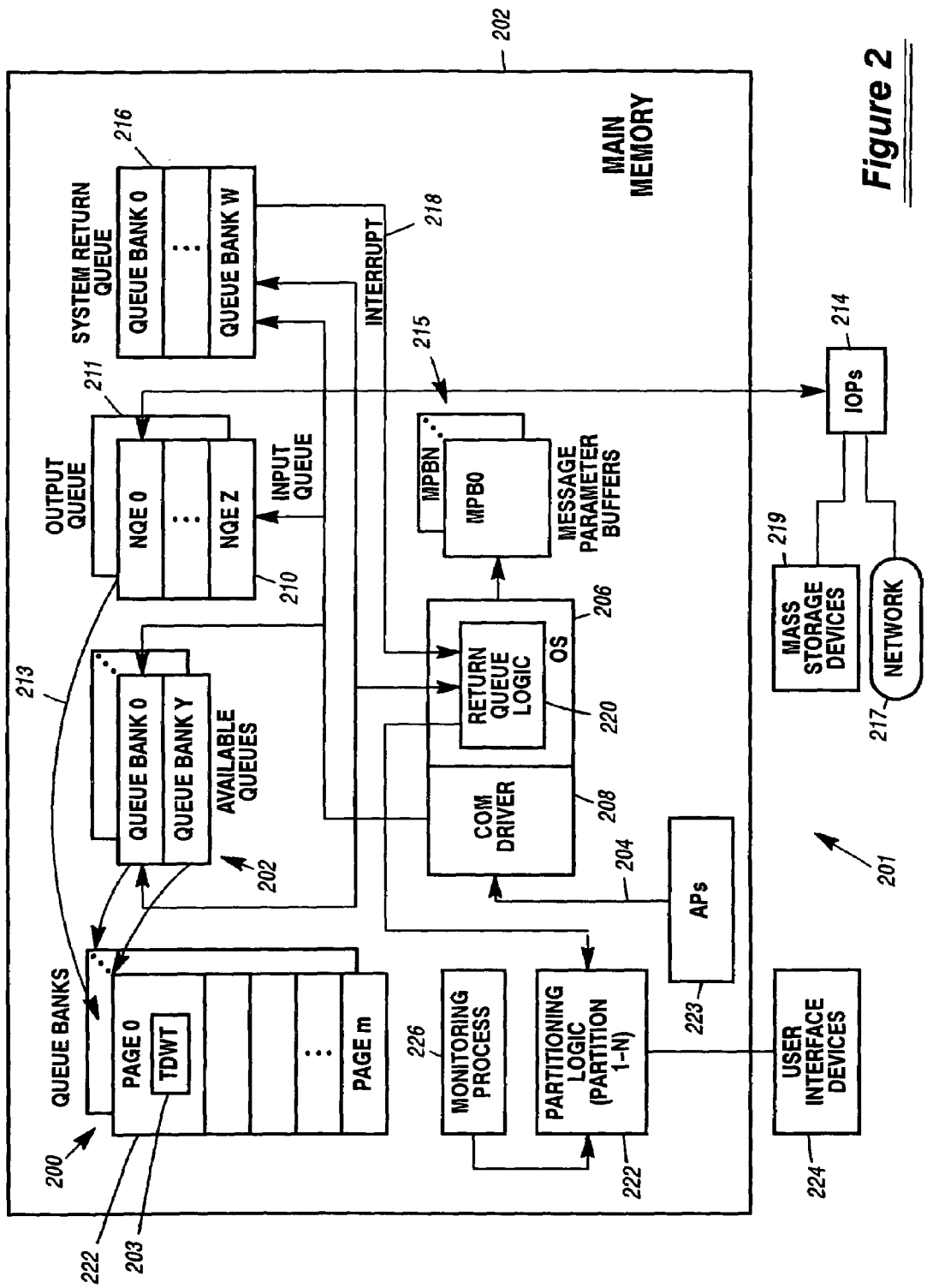
FIG. 2 is a block diagram illustrating one embodiment of a system according to the current invention.

FIG. 2 is a block diagram illustrating one embodiment of a data processing system 201 according to the current invention. This system is configured in a manner similar to that shown in FIG. 1, with one or more IPs 104 coupled to main memory either directly (as shown in FIG. 2) or via interconnect logic 102. For ease of reference, however, interconnect logic 102 and IPs 104 are not shown in FIG. 2.

System 201 employs the use of queue banks 200 to perform I/O operations. A queue bank is a relatively large area of memory that is allocated by OS 206 and that resides within a contiguous area of virtual address space. In one embodiment, this contiguous area of virtual address space maps to a pre-determined number of pages of physical memory. For instance, the queue banks 200 of FIG. 2 each include M physical pages. These physical pages need not be contiguous within physical memory.

Each of queue banks 200 may be thought of as a reusable container of memory that has been allocated for performing I/O operations. Each queue bank remains locked such that it will not be paged out of memory and will not be re-mapped to different physical addresses. The address translation for each page of a queue bank is generally performed by the OS the first time a queue bank is used as the target of an I/O operation, and is thereafter not changed. For example, in one implementation, the first page in each queue bank (shown as page 0 in FIG. 2) contains a transfer data word template (TDWT) 203. The first time the queue bank is used, virtual-to-physical address translation is performed, and the physical addresses for each of pages 1-M of the queue bank are stored to the TDWT of page 0. Once the physical addresses are stored within the TDWT in this manner, it is generally unnecessary to perform virtual-to-physical address translation the next time the queue bank is used.

In some cases, and for reasons largely beyond the scope of the current invention, it is possible that the information contained within a TDWT of a queue bank may be reset while the queue bank is still is use. In such cases, address translation will be performed again for the queue bank the next time that queue bank is selected for use when performing an I/O operation, as will be described below.

When a queue bank is first created, it is associated with exactly one of available queues 202. This involves adding the queue bank to a corresponding one of available queues 202. In one embodiment, each of the available queues 202 is a doubly-linked list of queue banks, and a queue bank is added to an available queue by linking it either to the beginning or the end of the list. The first and last queue banks in the linked list are pointed to by first and second entries, respectively, of the corresponding available queue structure. This is illustrated by FIG. 2, which shows an available queue that includes queue banks 0 and Y as the first and last queue banks, respectively, on its linked list. Each queue bank in the linked list is linked to one or two adjacent queue banks via respective pointers contained in a header structure of the queue bank. In one embodiment, this header is stored in page 0 of the queue bank along with the TDWT.

Sometime after a queue bank is added to a corresponding available queue, assume an I/O request represented by arrow 204 is submitted by one of APs 223 to initiate an I/O operation. For purposes of this illustration, it will be assumed the I/O operation involves network 217. According to the invention, this request is provided to communication (COM) driver 208. This driver is a software entity that operates in conjunction with OS 206 to facilitate communication between network 217 and data processing system 201.

According to the invention, this I/O request will not identify a buffer to be used in performing the I/O transfer operation, as was the case in the system of FIG. 1. Instead, a queue bank will be assigned for use in performing the operation. To do this, the communication driver 208 of the OS 206 obtains the address for a next available queue bank to be used to perform an I/O operation. In one embodiment, this is accomplished by the communication driver 208 executing a DEQUEUE instruction that is part of the machine instruction set of IPs 104 (not shown in FIG. 2). This DEQUEUE instruction obtains the address for the next available queue bank from a predetermined one of available queues 202 and returns this address to communication driver 208. The available queue 202 from which the queue bank is obtained is selected based on the identity of the requester, the identity of the communication driver 208, and/or on some other criteria selected by system designers as determined by system information maintained by OS 206.

As previously described, in one embodiment of the invention, available queue 202 is implemented as a linked list. A queue bank may be added to the front or back of this list in a manner to be discussed further below. In this embodiment, when the DEQUEUE instruction is executed to obtain a queue bank to be used to perform the current I/O request, the DEQUEUE instruction returns an address to the queue bank that was obtained from the front of this linked list.

If the I/O operation is a write operation that transfers data from main memory 109 to network 217, the software entity requesting the I/O operation (e.g., AP 223) will pass the data that is to be transferred to the communication driver 208. The communication driver will store this data into a designated area of the newly-acquired queue bank. As is known in the art, this type of data copy operation is required because the communication driver 208 and IOPs 214 will not generally have access to the address space of the requester. Therefore, the data must be transferred into the queue bank, which is accessible to both communication driver 208 and IOPs 214.

Next, the communication driver 208 creates and initializes an I/O packet for the current request. This I/O packet, which is stored at a predetermined location within the newly-acquired queue bank, contains the size of the data transfer that is to occur, as well as the location within the queue bank to which, or from which, the data will be transferred. If the I/O operation is a write operation, the I/O packet will point to the area within the queue bank that stores the data.

After the I/O packet is created within the queue bank and any transfer of data has been completed in the foregoing manner, communication driver 208 makes a request to the OS 206. In one embodiment, this request is made via a call gate that is available for requesting communication services. This request passes parameters to the OS, including the address of the queue bank to be used for the current I/O operation, and the type of I/O operation (e.g., read versus write) that is to be performed.

In response to the request, the OS 206 determines whether the TDWT template for the acquired queue bank contains the necessary address information that is required to perform the I/O operation. This template, which is stored in the first page of the queue bank, may be set up when the queue bank is first created, or when the queue bank is first used to perform an I/O operation. In either case, the template is initialized by performing a virtual-to-physical address translation process to obtain the physical address of each page of physical memory mapped to the queue bank. These addresses are stored in the TDWT for use by the IOP in accessing the queue bank. This address translation process typically does not need to be repeated when the queue bank is used again in the future unless the TDWT is reset, which may occur for reasons beyond the scope of the current invention. In the rare instance where the TDWT is cleared, the OS 206 repeats the virtual-to-physical address translation process to set up the TDWT before the queue bank is again utilized to perform an I/O operation.

In addition to setting up the TDWT, if necessary, OS 206 also builds a network queue entry (NQE) for the requested I/O operation on an appropriate queue. If the operation is transferring data from network 217 to main memory 202, the entry is placed on input queue 210. Conversely, if the operation is transferring data from main memory 202 to network 217, the entry is placed on output queue 211. In one embodiment, each of these queues is a circular queue that contains a predetermined number of "spaces". Each space is available to store an NQE. In one case, each queue contains 1024 spaces. The OS 206 keeps track of which space is to be used to build the next NQE.

In some cases, when the OS locates the next available space in which to build an NQE, the OS 206 will find that some "clean-up" processing must be performed on behalf of some previous I/O operation that used the same queue space to complete a previous I/O operation. The details associated with this clean-up activity are described below.

After performing any required clean-up processing, the OS 206 creates an NQE on the next available space of the input queue 210 or output queue 211, as determined by the type of I/O operation to be performed. This NQE points to the first page (e.g., page 0) of the queue bank that will be used to perform the I/O operation, as represented by arrow 213. At this time, the OS also increments a "use-count" for this queue bank to a non-zero value. This non-zero use-count is used to record the fact that the associated queue bank may be involved in an on-going I/O operation. The significance of the use-count is discussed further below.

OS 206 also creates a description of the I/O operation that is to be performed. This description is created in a corresponding one of the message parameter buffers (MPBs) 215, which are buffers contained within the address space of OS 206 that are allocated for this purpose. To create the description of the I/O operation, the OS 206 first sets an "update-in-progress" bit in the corresponding MPB to signal that an I/O description is being created within this buffer. Then the OS uses the TDWT of the assigned queue bank to build a description that contains the physical address of each page in the queue bank to which, or from which, data is to be transferred, as well as the amount of data that is to be transferred to, or from, each such page.

When the description within the MPB has been completed, OS 206 clears the update-in-progress bit of the MPB to signal that the description is ready for use. The OS also sets a queued bit within the MPB to indicate that the acquired queue bank is considered to be queued to the input queue 210 or the output queue 211 by virtue of the created NQE that points to that queue bank. Finally, the OS sets a valid bit in the NQE to indicate that the NQE is now ready to be used by one of the IOPs to perform an I/O operation.

One or more IOPs 214 that are eligible to process newly-created NQEs are monitoring the input queue 210 and the output queue 211. When an available one of these IOPs detects the setting of a valid bit, that IOP begins to process the entry. In particular, the IOP accesses the NQE to obtain the pointer to the queue bank for this I/O operation. The IOP also accesses the MPB associated with the NQE to obtain the description for this I/O operation. The IOP uses this description to transfer data to/from the queue bank from/to network 217.

When an I/O operation is completed, the IOP 214 will store status describing whether that operation completed successfully. In one embodiment, this status is stored in the NQE for the operation. The IOP also clears the valid indicator within the NQE to indicate that this queue space no longer stores an NQE that is to be processed by an IOP. The IOP then interrupts the OS 206 to communicate that the I/O operation is completed. In response to this indication, OS 206 will retrieve the status and perform any required error processing and recovery actions if the operation did not complete successfully. The OS then makes a call to the communications driver 208 to perform any data handling that is required. For instance, if the operation was an input operation whereby data was transferred from network 217 to a queue bank, communications driver 208 will retrieve the data from the queue bank and pass it to the requester, which may be one of APs 223 or some other software entity.

When the communications driver 208 has finished passing any data to the requester, the communications driver may move the address of the queue bank to a system return queue 216. The system return queue 216 is a queue that is used to eventually return the queue bank to the one of the available queues 202 with which it is associated.

After a predetermined number of queue banks have been queued to the system return queue 216, an interrupt is generated to return queue logic 220, which is part of OS 206, as represented by arrow 218. The return queue logic 220 has visibility to system information that identifies to which of the available queues 202 each queue bank is associated. Recall that this association is formed between the queue bank and an available queue at the time the queue bank was created. In this manner, the return queue logic 220 determines the appropriate one of the available queues 202 to which each queue bank is to be returned, and adds the queue bank back onto the linked list of this available queue. This allows a queue bank that is so processed to become available for re-use in performing another I/O operation.

When a queue bank is moved from the system return queue 216 to the associated one of the available queues 202 in the above described manner, it is generally advantageous to place that queue bank at the front of the linked list for the available queue for the following reason. In one embodiment, communication driver 208 obtains queue banks from the front of the available queue. Because queue banks are both returned, and obtained, from the front of the queue, it is likely that a queue bank that was recently added to the available queue will be re-used relatively quickly. This is beneficial to system performance, because it is more likely that the addresses for a particular queue bank are still resident in system caches such as cache 105 at the time a queue bank is selected for re-use, thereby improving performance of the future I/O operation that will next use the queue bank. This is described further below.

As described above, return queue logic 220, rather than corn driver 208, returns each queue bank to an appropriate one of the available queues 202. This is required for several reasons. First, the communications driver 208 does not have the privilege level required to place a queue bank back onto the available queues 202. Moreover, communications driver 208 does not have access to the system information required to determine to which of the available queues 202 a particular queue bank is associated.

In a manner similar to the foregoing, while corn driver 208 obtains the queue bank and sets up the I/O packet in preparation for initiation of an I/O operation, much of the other processing is performed by OS 206. Such processing includes generation of the NQE and the creation of the description in the corresponding MPB. This is because the input queue 210, output queue 211, and MPBs 215 are contained within address space of OS 206, which is not available to communication driver 208. This helps to ensure that the data structures used for I/O operations are maintained in a secure manner that will protect system integrity.

One of the implications of corn driver 208 not having access to the MPBs 215 is that when the corn driver moves a queue bank to the system return queue 216, the driver cannot clear the associated queued bit. Stated otherwise, the communications driver 208 cannot clear the queued bit contained within the one of the MPBs that was used to describe the recently-completed I/O operation because that driver 208 does not have access to the address space containing the MPB. Therefore, this bit remains set until the OS can clear it later during the "clean-up" processing that was alluded to above.

The clean-up processing occurs when the OS selects a next space within either the input queue 210 or the output queue 211 to build a next NQE. A space is considered available if the valid bit is cleared, indicating the space does not contain a NQE that is involved in an on-going I/O operation. After the OS selects an available queue space for use, the OS determines whether a previous NQE for a completed I/O operation remains stored in this queue space. If so, the OS determines which queue bank was pointed to by this previous NQE. The OS then decrements the "use-count" for that queue bank. This indicates that the queue bank is no longer involved in that previous I/O operation represented by the previous NQE. The OS also clears the queued bit in the MPB that is associated with this queue space. This further indicates that the queue bank is no longer considered queued to this input or output queue. The OS may then proceed to build the next NQE in this queue space.

The foregoing description provides a general illustration of how I/O operations are performed to network 217. Because all address translation and locking operations are completed ahead of time for the queue banks, these operations need not be performed as each I/O request is received. This reduces delay and increases system throughput as compared to systems that allocate memory for I/O operations as I/O requests are received.

The mechanism described above in regards to transfers via network 217 may likewise be employed when performing I/O operations to mass storage devices 219. However, the performance benefits of using queue banks are less important when initiating I/O operations to the mass storage devices, since the transfer rates involved in such operations are significantly lower than the transfer rates attained when performing communication via network 217.

The above described mechanism may be further optimized for use in a "partitionable" data processing system. As discussed above, a partitionable data processing system includes partitioning logic 222 that is used to create processing subsystems, or partitions. The partitions created by partitioning logic 222 are represented as partitions 1-N of FIG. 2.

Each partition including at least a sub-set of the resources of the data processing system, and operates under a respective instance of an operating system. The resources that are included within a partition are communicatively coupled using selectively enabled hardware and software switches and enables. The resources included in any given partition are selected, and then communicatively coupled together, using functions supported by partitioning logic 222. These functions may be invoked by a human operator, or, in some cases, by automated processes running under the control of the operating system. In the former case, the human operator may utilize one or more user interface devices 224 such as keyboards, display screens, cursor control devices, and so on, to engage the partitioning logic 222 and create the processing partitions.

It is often desirable to reconfigure the partitions of a data processing system. This may be necessary to move system resources from a first partition that is executing relatively low-priority tasks to a partition that is executing higher-priority tasks, for instance. The resources that are being moved may include an IP, an IOP, and/or an area of main memory.

The types of reconfiguration activities described above may pose problems when a memory area that contains a queue bank is to be moved from a first to a second partition. In this type of scenario, the I/O operations occurring to the queue bank must be considered. Specifically, re-partitioning cannot occur until all queue banks contained in the physical memory space involved in the re-partitioning activity are no longer being used to complete an I/O operation. That is, re-partitioning may be completed when the "use-counts" for all such queue banks are decremented to zero. One way to achieve this is by simply suspending initiation of all new I/O operations within the first partition. When any currently-active I/O operations are completed, the use-counts of all queue banks within the first partition will be decremented to zero. The memory area in question may then be moved to the second partition and I/O activity in the first partition may be resumed. This is not optimal, however, since it results in disruption of normal processing operations.

The current system and method provide optimizations that allow normal I/O processing to continue even when memory containing queue banks is being moved from a first partition to a second partition, as follows.

A first optimization involves how use-counts are decremented within the system. As previously described, when an I/O operation completes, the communication driver 208 moves the queue bank that was used to perform that I/O operation to the system return queue 216. The communication driver cannot decrement the use-count for this queue, since that use-count is maintained in memory that is only accessible to the OS 206. Moreover, recall that the OS 206 does not decrement the use-count until the "clean-up" processing occurs for the queue space that contains an NQE that pointed to the queue bank. If the input queue 210 and output queue 211 contain a significant number of queue spaces (e.g., 1024 spaces), this clean-up processing for a particular queue bank may not occur until long after the I/O operation that used the queue bank completed. This makes it very difficult to complete partitioning activity involving memory, since queue banks may appear as being in use long after they are no longer involved in I/O activity.

The first optimization addresses the above-described limitation by utilizing return queue logic 220 to periodically scan the input queue 210 and the output queue 211. In one embodiment, each time return queue logic 220 is called to move queue banks from the system return queue 216 to an associated one of the available queues 213, the return queue logic 220 initiates the scan operation of the input and output queues. This scan operation looks for any queue space in which the valid bit is not set, but which in which the associated one of the MPBs 215 has an activated queued bit set. When this type of queue space is located, return queue logic decrements the use count for the queue bank that is pointed to by this queue space. In this manner, return queue logic 220 performs the "clean-up" processing for any given queue bank much sooner than if that clear-up processing were delayed until the time when that queue space was again needed to store an NQE for another I/O request. As a result, use-counts for queue banks return to zero much more quickly so that memory re-partitioning may be completed in an expedited manner.

The scan operation described above may be performed not only when return queue logic 220 is called to move queue banks from the system return queue, but at other times as well. For instance, when the system has unused execution cycles that would otherwise be wasted, the return queue logic 220 may scan the input and output queues to decrement use counts as needed.

Yet another optimization involves the way in which return queue logic 220 returns queue banks from system return queue 216 to an associated one of available queues 202. Recall that, in general, when a queue bank is moved from the system return queue 216 to an associated one of available queues 202, it is advantageous to place that queue bank at the front of the associated available queue. Because communication driver 208 selects a queue bank for re-use from the front of the available queue, this makes it likely any given queue bank will only reside on the available queue for a short while. As a result, the addresses for that queue bank are still likely to be resident in system caches such as cache 105 at the time the next I/O operation that utilizes this queue bank is initiated.

The foregoing may be appreciated by returning to FIG. 1. Assume that a queue bank was recently used to transfer data from main memory 100 to IOP 106A via the path represented by dashed line 116. Just prior to the time the queue bank was made available for processing by IOP 106A, assume IP 104J accessed the header structure of the queue bank to initialize information that describes the operation that is to be performed by IOP 106A. As a result, various addresses of the queue bank are resident within one or more caches such as cache 105 of IP 104J. Such caches may include a first, second, and/or some other cache embedded within, and/or coupled to, IP 104J. If the queue bank is selected to perform an another I/O operation again before those addresses are aged out of the cache(s), accessing the queue bank to prepare it for use in performing this other I/O operation will be completed much faster than if the addresses were not cached.

According to the second optimization, it is not considered desirable to return a queue bank to the front of the associated available queue in all circumstances. Instead, each time return queue logic 220 obtains a queue bank address from the system return queue 216, the return queue logic 220 determines whether this queue bank is contained, in whole or in part, in a memory area that is being re-partitioned. Return queue logic 220 makes this determination by accessing tables maintained within partitioning logic 222 that record which memory areas, if any, have been designated for removal from the partition. If any page of a queue bank is included in a memory area that is being removed from a partition, that queue bank is added to the end, rather than the beginning, of the linked list for the associated available queue 202.

In one embodiment, each of the available queues 202 of the current embodiment may hold a maximum of $2^{35}$-1 queue banks. The number of queue banks queued to an available queue at any given time will vary, and is application-dependent. In generally, a linked list of an available queue contains a sufficient number of queue banks so that a queue bank placed at the end of the linked list will not be selected for re-use in any future I/O operation before all queue banks implicated by any pending re-partitioning activity have also been added to the end of the available queue in a similar manner.

Next, the re-partitioning activity is described in more detail. When resources are being removed from a first processing partition, a monitoring process 226 is monitoring activity associated with these resources. For instance, returning to the current example, monitoring process 226 is able to access tables that may be retained in the address space of partitioning logic 222. These tables contain the physical address of the first page of each queue bank being utilized by the partition. These tables are updated by OS 206 as queue banks are created and destroyed. Using the physical address of the first page of the queue bank, monitoring process 226 is able to obtain the physical addresses of all other pages in the queue bank. The monitoring process is thereby able to determine whether any page of a queue bank resides in a physical address range that is being moved out of the partition. If so, the use-count for this queue bank must be decremented to zero before the physical address range allocated to this queue bank may be moved to a different partition.

In the foregoing manner, monitoring process 226 locates all queue banks that are implicated by the re-partitioning activity. The monitoring process then continues monitoring the use-counts for all such queue banks. When all such use-counts have been decremented to zero, the memory that is being moved may be re-partitioned. This can generally be accomplished without halting I/O activity in the partition because the first optimization described above allows use counts for all queue banks to be decremented to zero relatively quickly after a queue bank is no longer being used. Moreover, the second optimization described above allows a queue bank that is involved in any re-partitioning activity to be placed at the end, rather than the beginning, of an associated available queue.

The combined effect of the two optimizations described above is that the use count for a queue bank involved in any re-partitioning activity will generally be decremented to zero long before that queue bank is selected for re-use. This gives ample time for monitoring logic 226 to signal partitioning logic 222 and OS 206 to remove this queue bank from use within the current partition so that the memory containing the queue bank may be moved to a new processing partition.

In a current embodiment, removing memory from a processing partition involves updating hardware and software tables contained within partitioning logic 222 to indicate that the memory area is no longer available for use by that partition. Thereafter, the memory area that has been removed from the first partition may be re-initialized and re-configured for use by another partition. If desired, this memory area may be allocated for use as one or more queue banks of the other partition.

As may be appreciated, the entities shown in FIG. 2, including the operating system 206, the queue banks 200, the various queue structures, the partitioning logic 222 and the monitoring process 226 will be replicated within the system for each partition that is created. This allows the partitions to run independently of one another.

Figure 3:
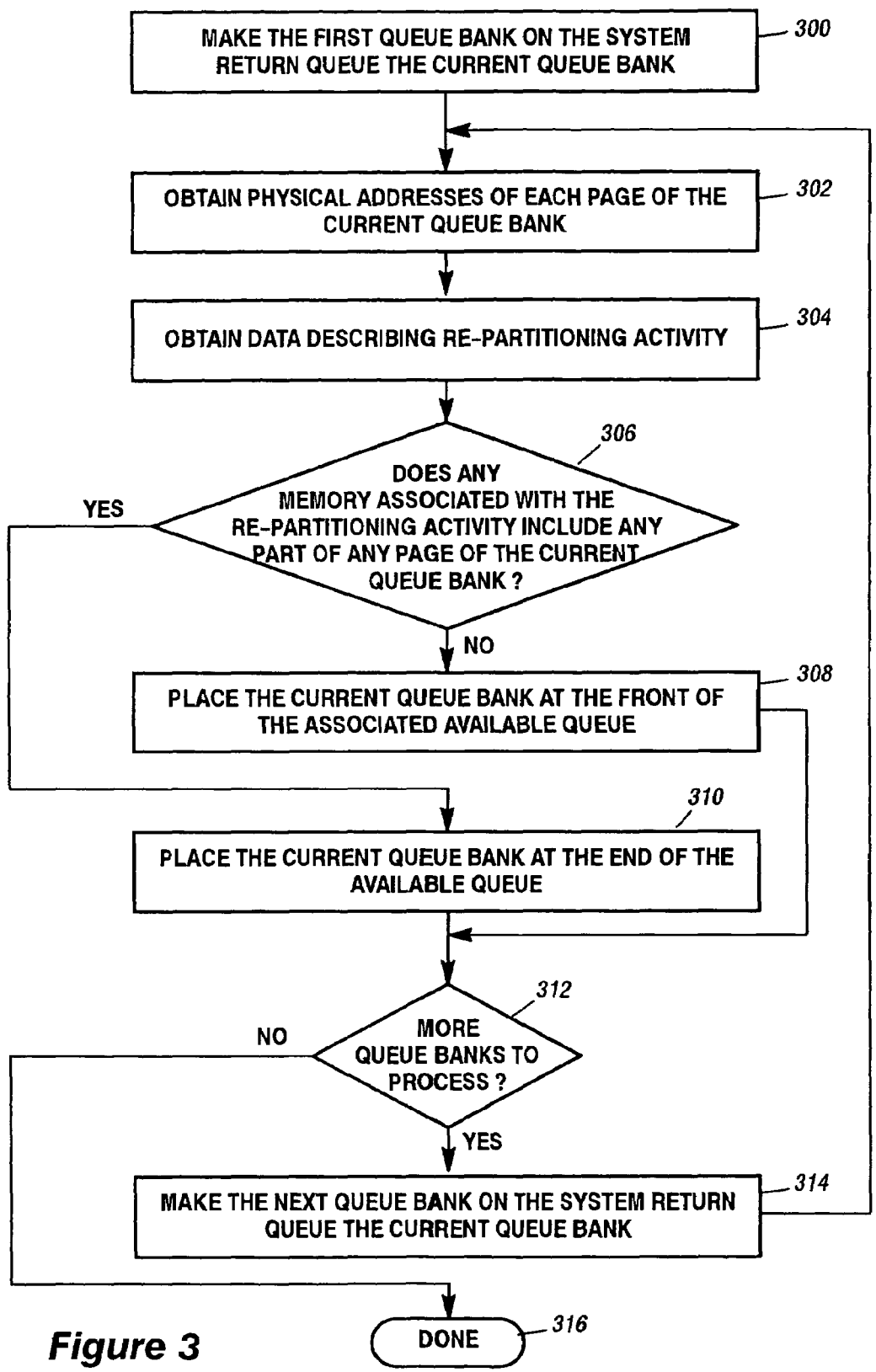
FIG. 3 is a flow diagram illustrating one method according to the current invention.

FIG. 3 is a flow diagram illustrating one method according to the current invention. In one embodiment, this method is performed by the return queue logic 220 according to the second optimization described above. This optimization provides a mechanism for adding a queue bank to either the front or the back of an associated one of available queues 202 based on partitioning activity occurring in the system.

According to this process, a first queue bank on a system return queue is made the current queue bank (300). The physical addresses of each page of the current queue bank is obtained (302). In one embodiment, this is accomplished by referencing the TDWT contained in the first page of the queue bank to obtain the physical addresses of all other pages in the queue bank.

Next, data describing any re-partitioning activity is obtained (304). This may be obtained via tables maintained by partitioning logic 222, for example. If this re-partitioning activity involves removing any memory from the current partition, it is determined whether the memory being removed includes any part of any page of the current queue bank (306). If not, the current queue bank may be added to the front of the associated available queue (308). Otherwise, the current queue bank is added at the end of the associated available queue (310).

It is next determined whether any queue banks remain to be processed (312). If so, processing continues to step 314, wherein the next queue bank on the system return queue is made the current queue bank. Processing then returns to step 302 so that the method is repeated for the new current queue bank. Otherwise, if no additional queue banks remain to be processed in step 312, execution is complete (316).

The method of FIG. 3 may be initiated in one of several ways. In one embodiment, an interrupt may be generated when the system return queue 216 contains a predetermined number of queue banks. This interrupt prompts processing of the system return queue entries. In another embodiment, the method may be initiated at predetermined time intervals. Alternatively, the method may be initiated during unused execution cycles of an IP 104 that is executing OS 260.

Figure 4:
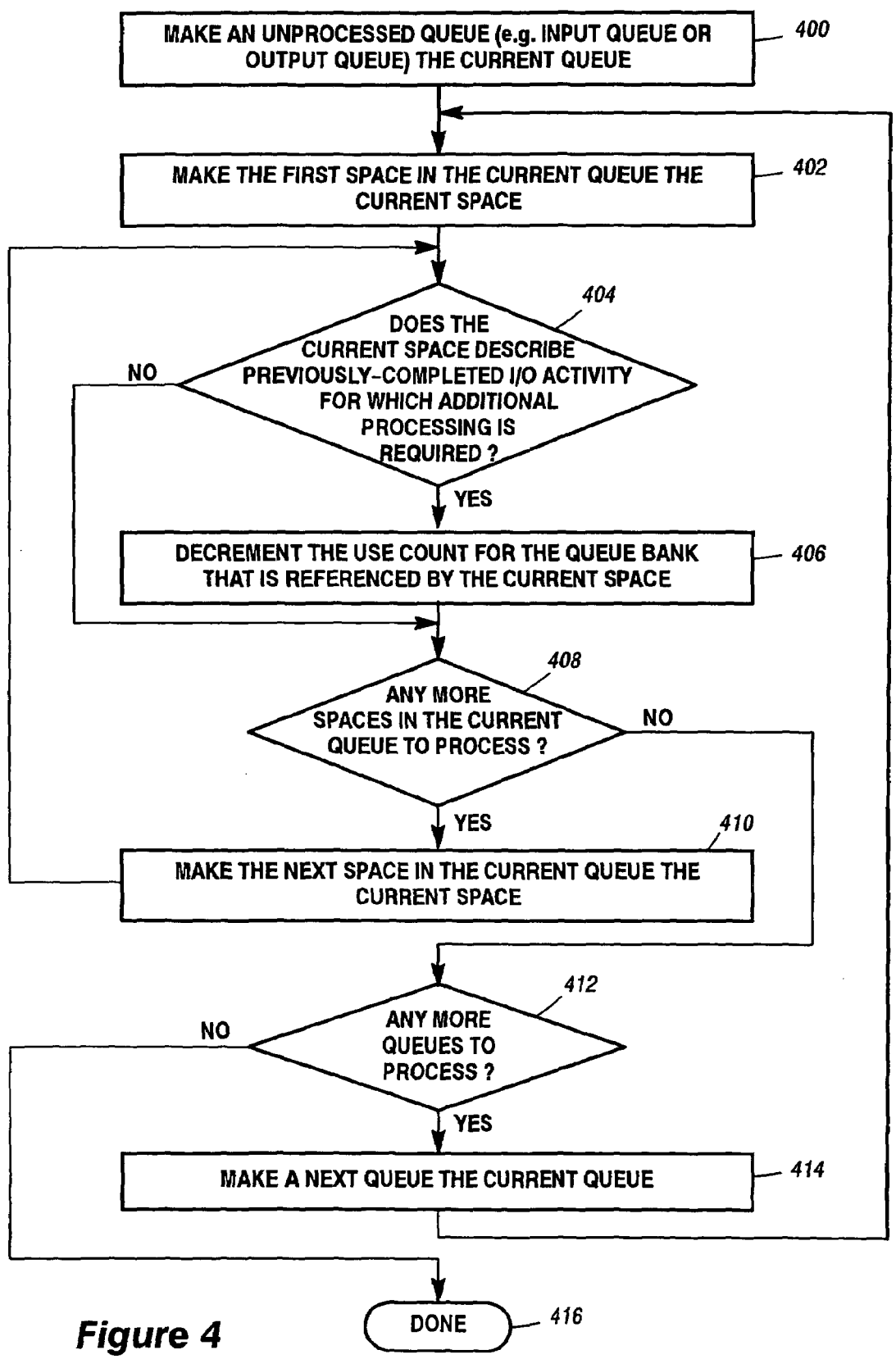
FIG. 4 is a flow diagram of a method of processing the input and output queues according to the current invention.

FIG. 4 is a flow diagram of a method of processing the input and output queues according to one embodiment of the current invention. First, one of the unprocessed queues (e.g., either the input queue 210 or the output queue 211) is selected as the current queue (400). A first space in the current queue is then made the current space (402). Next, it is determined whether the current space describes previously-completed I/O activity for which additional processing is required (404). In one embodiment, this is accomplished by determining whether the current space includes a valid bit that has been cleared, and the associated one of the message parameter buffers 215 contains a queued bit that is still set.

If the current space describes previously-completed I/O activity for which additional processing is required, the use count for the queue bank that is referenced by the current space is decremented (406). This indicates that the queue bank is no longer involved with that previously-completed I/O activity.

It is next determined whether any more spaces are available in the current queue for processing (408). If so, the next space in the current queue is made the current space (410), and processing returns to step 404 where it is determined whether the current space describes previously-completed I/O activity.

In step 404 it may be determined that the current space does not describe previously-completed I/O activity. This may be because the valid bit is still set, indicating I/O activity is on-going for this queue space. Alternatively, this may be because the valid bit is cleared, and the queued bit within the associated message parameter buffer is also cleared. This latter scenario may occur if this is the first time this queue space is being used. In any of these scenarios, processing proceeds to step 408, where it is determined whether there are any more spaces in the current queue to process. If so, execution continues to step 410 in the manner described above.

If, in step 408, no more spaces in the current queue remain to be processed, it is determined whether another queue (e.g., input or output queue) remains to be processed (412). If so, this other queue is made the current queue (414), and processing returns to step 402 so that the method may be repeated for this additional queue. Otherwise, if all queues have been processed in step 412, processing has been completed.

The method of FIG. 4 may be performed as an extension of the method of FIG. 3, if desired. That is, each time return queue logic 220 is called to process the system return queue 216, the return queue logic 220 may also process both the input and output queues 210 and 211, respectively. Alternatively, the processing may be initiated at different times. For instance, an interrupt may prompt return queue logic 220 to process the system return queue 216, whereas the input and output queues may be processed at predetermined time intervals as determined by a system timer. Various alternatives will be apparent to those skilled in the art.

Figure 5:
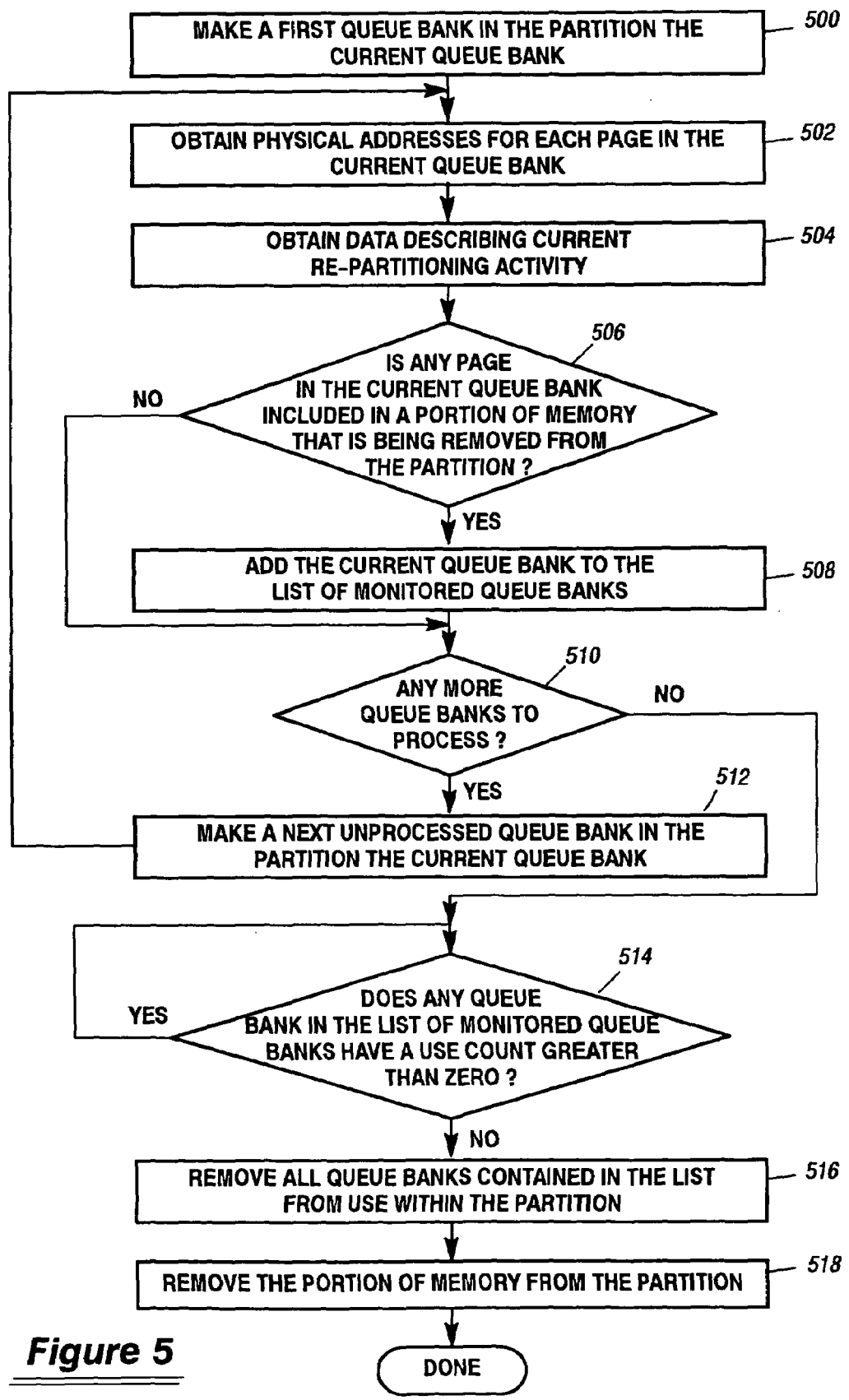
FIG. 5 is a flow diagram of one monitoring method according to the current invention.

FIG. 5 is a flow diagram of one embodiment of a method performed by monitoring process 226 of FIG. 2. First, a first queue bank in the partition is made the current queue bank (500). In one embodiment, this is accomplished using a list of all queue banks contained in the partition. This list may be maintained in tables managed by partitioning logic 222, or in other system information stored within memory in the address space of OS 206.

Next, the physical address for each page of the current queue bank is obtained (502). This information may be acquired by referencing the TDWT contained in the first page of the current queue bank, for instance. Next, data describing current re-partitioning activity is obtained (504). In one embodiment, this information is maintained by partitioning logic 222.

It may next be determined whether any page in the current queue bank is included in a portion of memory that is being removed from the partition (506). If not, it is determined whether any more queue banks remain to be processed (510). If so, a next queue bank in the partition is made the current queue bank (512), and processing returns to step 502 of FIG. 5.

Returning to step 506, if any page in the current queue bank is included in any portion of memory that is being removed from the partition, the current queue bank is added to a list of monitored queue banks (508). It may then be determined whether any more queue banks exist within the partition that have yet to be processed (510). If so, a next unprocessed queue bank is made the current queue bank, and execution returns to step 502.

If, in step 510, no more queue banks remain to be processed in the current partition, processing proceeds to step 514 where it is determined whether any queue bank in the list of monitored queue banks has a use-count that is greater than zero. If so, processing continues to wait on step 514 until all queue banks in the list of monitored queue banks have use-counts of zero. When all such use-counts have been decremented to zero, the queue banks on the list may be removed from use within the partition (516). This involves removing the addresses of the queue banks from the associated available queue, and also from system information that is retained by OS 206 and/or partitioning logic 222. Finally, the portion of memory that is being removed from the partition may be safely removed (518).

A variation of FIG. 5 may be provided in regards to step 514. If looping on step 514 continues for more than a predetermined time period without all use-counts being decremented to zero, it may be advantageous to halt processing for any newly-received I/O requests. This will ensure that all use-counts for all queue banks in the partition will eventually return to zero so that re-partitioning activity may be completed. This may be necessary, for instance, if an available queue is associated with a relatively small number of queue banks. In this case, even though the queue banks are being returned to the end, rather than the beginning, of the associated available queue, they may never-the-less be entering into re-use before they can be removed from the partition. This type of situation should not arise if each available queue has more than a predetermined number of queue banks with which it is associated. That predetermined number is implementation specific, and may be determined by a system administrator based on factors such as the rate at which I/O requests are being issued within the system.

The current invention provides a mechanism to allow queue banks to be used in a partitionable system so that memory containing a queue bank may be removed from a partition without requiring the need to halt on-going I/O activity. It may be appreciated that embodiments of the invention described above are merely illustrative in nature. For instance, in the flow diagrams of FIGS. 3-5, some steps may be re-ordered or eliminated entirely without departing from the scope of the current invention. Similarly, other steps may be added to the flow diagrams. In a like manner, the system block diagram of FIG. 2 should be considered exemplary only. Many other types of data processing systems and software constructs may be used instead of those shown in FIG. 2 without departing from the scope of the current invention. Thus, the embodiments described herein should be considered illustrative only, with the scope of the invention being determined only by the Claims that follow.

What is claimed is:

1. Within a data processing system that supports multiple processing partitions, a computer-implemented method for managing I/O operations, comprising:
   determining whether a queue bank that has been dedicated for use in performing I/O operations is currently waiting to be re-used;
   making the queue bank available for re-use in performing the I/O operations in a manner that is based upon whether modifications that affect the queue bank are being made to a processing partition containing the queue bank;
   selecting memory for removal from the processing partition containing the queue bank;
   determining that the queue bank includes at least part of the selected memory;
   ensuring that the queue bank is not selected for re-use before the selected memory has been removed from the processing partition containing the queue bank by placing the queue bank at an end of an available queue such that the queue bank will not be selected for re-use before the selected memory has been removed from the processing partition containing the queue bank.

2. The method of claim 1, further comprising:
   determining that no memory containing the queue bank has been selected for removal from the processing partition containing the queue bank; and
   allowing the queue bank to immediately be made available for re-use following the determination.

3. The method of claim 2, further comprising:
   caching addresses of the queue bank during execution of a previous I/O operation that used the queue bank; and
   selecting the queue bank for re-use in another I/O operation while the addresses of the queue bank are still cached, whereby the other I/O operation is completed more efficiently.

4. The method of claim 2, further comprising placing the queue bank at a beginning of an available queue such that the queue bank may be selected for re-use substantially immediately.

5. The method of claim 1, further comprising:
   allocating one or more pages of storage space for inclusion in the queue bank;
   performing virtual-to-real address translation for each of the one or more pages; and
   locking each of the one or more pages in a memory of the data processing system.

6. The method of claim 1, wherein the modifications include removing memory from the processing partition containing the queue bank, at least some of the memory being allocated for use by the queue bank, and wherein if it is determined the modifications are being made, making the queue bank unavailable for immediate re-use.

7. The method of claim 1, wherein the steps of claim 1 are performed for multiple queue banks, and further comprising removing memory from the processing partition, wherein the memory was previously allocated for use by one or more of the queue banks, the memory being removed only after it has been determined that all of the one or more of the queue banks are no longer involved in performing any of the I/O operations.

* * * * *